(12) United States Patent
Watanabe et al.

(10) Patent No.: US 9,688,817 B2
(45) Date of Patent: Jun. 27, 2017

(54) METHOD FOR PRODUCING POLYARYLENE SULFIDE RESIN AND POLYARYLENE SULFIDE RESIN COMPOSITION

(71) Applicant: DIC CORPORATION, Tokyo (JP)

(72) Inventors: Hajime Watanabe, Ichihara (JP); Toshio Hinokimori, Ichihara (JP)

(73) Assignee: DIC CORPORATION (TOKYO), Tokyo (JP)

( * ) Notice: Subject to any disclaimer, the term of this patent is extended or adjusted under 35 U.S.C. 154(b) by 0 days.

(21) Appl. No.: 14/779,346

(22) PCT Filed: Mar. 20, 2014

(86) PCT No.: PCT/JP2014/057739
§ 371 (c)(1),
(2) Date: Sep. 23, 2015

(87) PCT Pub. No.: WO2014/156946
PCT Pub. Date: Oct. 2, 2014

(65) Prior Publication Data
US 2016/0060397 A1    Mar. 3, 2016

(30) Foreign Application Priority Data

Mar. 25, 2013 (JP) ................. 2013-062042

(51) Int. Cl.
| | | |
|---|---|---|
| C08G 75/16 | (2006.01) | |
| C08G 75/04 | (2016.01) | |
| C08G 75/02 | (2016.01) | |
| C08J 5/00 | (2006.01) | |
| C08K 5/00 | (2006.01) | |
| C08G 75/14 | (2006.01) | |
| C08L 81/00 | (2006.01) | |
| C08L 81/02 | (2006.01) | |
| C08L 81/04 | (2006.01) | |

(52) U.S. Cl.
CPC ............ *C08G 75/16* (2013.01); *C08G 75/02* (2013.01); *C08G 75/04* (2013.01); *C08G 75/14* (2013.01); *C08J 5/00* (2013.01); *C08K 5/00* (2013.01); *C08L 81/00* (2013.01); *C08L 81/02* (2013.01); *C08L 81/04* (2013.01)

(58) Field of Classification Search
CPC ...................................................... C08G 75/16
USPC .................................................. 528/389, 375
See application file for complete search history.

(56) References Cited

U.S. PATENT DOCUMENTS

| | | |
|---|---|---|
| 2,513,188 A | 6/1950 | Macallum |
| 2,583,941 A | 1/1952 | Gordon |
| 4,746,758 A | 5/1988 | Rule et al. |
| 4,786,713 A | 11/1988 | Rule et al. |
| 4,977,236 A | 12/1990 | Fagerburg et al. |
| 2009/0203872 A1 | 8/2009 | Lee et al. |
| 2011/0257363 A1 | 10/2011 | Shin et al. |
| 2011/0269935 A1 | 11/2011 | Shin et al. |
| 2013/0225771 A1 | 8/2013 | Kanomata et al. |
| 2014/0288263 A1 | 9/2014 | Kanomata et al. |
| 2015/0197605 A1 | 7/2015 | Lee et al. |

FOREIGN PATENT DOCUMENTS

| | | |
|---|---|---|
| JP | 4-506228 A | 10/1992 |
| JP | 2001-279097 A | 10/2001 |
| JP | 2008-247955 A | 10/2008 |
| JP | 2010-501661 A | 1/2010 |
| JP | 2012-514068 A | 6/2012 |
| JP | 2015-524510 A | 8/2015 |
| KR | 10-2010-0073733 A | 7/2010 |
| KR | 10-20100073733 A | 7/2010 |
| KR | 10-1183780 B1 | 9/2012 |
| KR | 10-1549205 B1 | 9/2015 |
| WO | 2012/057319 A1 | 5/2012 |
| WO | 2012057319 A1 | 5/2012 |

OTHER PUBLICATIONS

International Search Report dated Jun. 17, 2014, issued in counterpart International Application No. PCT/JP2014/057739 (1 page).

*Primary Examiner* — Duc Truong
(74) *Attorney, Agent, or Firm* — Westerman, Hattori, Daniels & Adrian, LLP

(57) ABSTRACT

A problem is to provide a method for producing a polyarylene sulfide resin having excellent reactivity to other compounds and resins, such as an impact resistance improver such as an epoxysilane coupling agent, a functional group-containing thermoplastic elastomer, or the like, and also provide a polyarylene sulfide resin composition produced by the production method, not containing chlorine atoms, and having the excellent reactivity. A method for producing a polyarylene sulfide resin includes performing polymerization reaction of a mixture containing a diiodo aromatic compound, a sulfur compound, and a polymerization inhibitor having a specified functional group. The problem can be solved by using a polyarylene sulfide resin composition containing a polyarylene sulfide resin having a specified terminal functional group and iodine atoms within a range of 0.01 to 10,000 ppm relative to the polyarylene sulfide resin.

7 Claims, No Drawings

METHOD FOR PRODUCING POLYARYLENE SULFIDE RESIN AND POLYARYLENE SULFIDE RESIN COMPOSITION

TECHNICAL FIELD

The present invention relates to a method for producing a polyarylene sulfide resin excellent in reactivity and a polyarylene sulfide resin composition produced by the method.

BACKGROUND ART

In various fields such as the electric/electronic component field, a tendency toward lower halogenation as an effort to the environment has recently been increased.

Polyarylene sulfide resins (may be abbreviated as "PAS" hereinafter) represented by polyphenylene sulfide resins (may be abbreviated as "PPS" hereinafter) attract attention as halogen-free materials because flame retardancy can be satisfactorily achieved without using a halogen-based flame retardant.

The polyarylene sulfide resins can be generally produced by polymerization reaction in an organic polar solvent using p-dichlorobenzene, sodium sulfide or sodium hydrosulfide and sodium hydroxide as raw materials (refer to Patent Literatures 1 and 2). Currently commercially available polyarylene sulfide resins are produced by this method, but the method not only requires a purification process for removing the organic polar solvent used in a production process and by-products such as sodium chloride but also leaves chlorine atoms remaining in the resins even after purification treatment.

Therefore, there is known a method for producing a polyarylene sulfide resin by melt polymerization using a diiodo aromatic compound and elemental sulfur without using chlorine atoms and a polar solvent (refer to Patent Literatures 3 and 4). This method can produce a polyarylene sulfide resin containing iodine atoms but can remove iodine atoms by sublimation by heating a polymerization reaction product or a reaction mass after polymerization reaction under a reduced pressure, thereby suppressing an iodine concentration in the resin. However, the method uses elemental sulfur ($S_8$) as a polymerization raw material, and thus a disulfide bond (—S—S—) remains in a skeleton of the finally resultant polyarylene sulfide resin, thereby causing deterioration in thermal characteristics and mechanical characteristics.

Therefore, a method for producing a polyarylene sulfide resin by melt polymerization of a mixture containing a diiodo compound, solid sulfur, and a sulfur-containing polymerization inhibitor has been developed (refer to Patent Literature 5). However, this method has the problem that the polyarylene sulfide resin produced by the method has low reactivity to other compounds and resins. Therefore, when an impact resistance improver such as an epoxysilane coupling agent, a functional group-containing thermoplastic elastomer, or the like is added to the polyarylene sulfide resin, the effect of improving impact resistance cannot be satisfactorily obtained, and thus application and using methods are limited.

CITATION LIST

Patent Literature

PTL 1: U.S. Pat. No. 2,513,188
PTL 2: U.S. Pat. No. 2,583,941
PTL 3: U.S. Pat. No. 4,746,758
PTL 4: U.S. Pat. No. 4,786,713
PTL 5: Japanese Unexamined Patent Application Publication No. 2010-501661

SUMMARY OF INVENTION

Technical Problem

Accordingly, a problem to be solved by the present invention is to provide a polyarylene sulfide resin composition not containing chlorine atoms and having excellent reactivity to other compounds and resins, such as an impact resistance improver such as an epoxysilane coupling agent, a functional group-containing thermoplastic elastomer, or the like, and also provide a method for producing the resin.

Solution to Problem

As a result of various researches, the inventors found that the problem can be solved by using a polymerization inhibitor having a specified functional group in a method for producing a polyarylene sulfide resin by melt polymerization of a mixture containing a diiodo compound, solid sulfur, and a sulfur-containing polymerization inhibitor, leading to the achievement of the present invention.

That is, the present invention relates to a method for producing a polyarylene sulfide resin having a group represented by general formula (1) below,

[Chem. 1]

(1)

(in the formula, X represents a hydrogen atom or an alkali metal atom), the method including performing polymerization reaction of a mixture containing a diiodo aromatic compound, elemental sulfur, and a polymerization inhibitor having a group represented by the general formula (1).

Also, the present invention relates to a polyarylene sulfide resin composition containing a polyarylene sulfide resin having a terminal group represented by general formula (1) below

[Chem. 2]

(1)

(in the formula, X represents a hydrogen atom or an alkali metal atom) and iodine atoms at a ratio within a range of 0.01 to 10,000 ppm relative to the polyarylene sulfide resin.

Advantageous Effects of Invention

The present invention can provide a polyarylene sulfide resin composition not containing chlorine atoms and having excellent reactivity to other compounds and resins, such as an impact resistance improver such as an epoxysilane coupling agent, a functional group-containing thermoplastic elastomer, or the like, and also provide a method for producing the resin.

DESCRIPTION OF EMBODIMENTS

Examples of a diiodo aromatic compound used in the present invention include diiodobenzene, diiodotoluene, diiodoxylene, diiodonaphthalene, diiodobiphenyl, diiodobenzophenone, diiododiphenyl ether, diiododiphenyl sulfone, and the like, but the present invention is not particularly limited to these. The substitution positions of two iodine atoms are not particularly limited but the two substitution positions are preferably as far from each other as possible in a molecule. The two substitution positions are more preferably para-positions, that is, 4,4'-positions.

An aromatic ring may be substituted by a phenyl group, a halogen, a hydroxyl group, a nitro group, an amino group, a C1-6 alkoxy group, a carboxy group, a carboxylate, arylsulfone, or arylketone as long as the effect of the present invention is not impaired. In this case, the substituent is preferably used within a range of 0.0001 to 5 (wt %) and more preferably within a range of 0.001 to 1 wt % relative to the unsubstituted diiodo aromatic compound.

The elemental sulfur used in the present invention represents a substance ($S_8$, $S_6$, $S_4$, $S_2$, or the like) composed of only sulfur atoms, and the form thereof is not limited. Specifically, elemental sulfur is commercially available as an official drug, but in the present invention, a mixture of $S_8$, $S_6$, and the like may be used as long as it is available for general purposes, and the purity is not particularly limited. Also, granular or powdery sulfur may be used as long as it is solid at room temperature (23° C.), and the particle diameter is not limited. However, the particle diameter is preferably 0.001 to 10 mm, more preferably 0.01 to 5 mm, and particularly preferably 0.01 to 3 mm.

The polymerization inhibitor (may be simply abbreviated as the "polymerization inhibitor" hereinafter) used in the present invention and having a group represented by the general formula (1) below,

[Chem. 3]

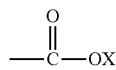
(1)

(in the formula, X represents a hydrogen atom or an alkali metal atom) is not particularly limited and any compound can be used as long as it has the group represented by the general formula (1) on a conjugated aromatic ring and inhibits or terminates polymerization reaction of the polyarylene sulfide resin during the polymerization reaction. Examples thereof include compounds each having one or a plurality of groups represented by the general formula (1) on a conjugated aromatic ring skeleton of a polymerization inhibitor, such as diphenyl disulfide, monoiodobenzene, thiophenol, 2,2'-dibenzothiazolyl disulfide, 2-mercaptobenzothiazole, N-cyclohexyl-2-benzothiazolyl sulfenamide, 2-(morpholinothio)benzothiazole, N,N'-dicyclohexyl-1,3-benzothiazole-2-sulfenamide, or the like. In the formula, X represents a hydrogen atom or an alkali metal atom, but in view of good reactivity, a hydrogen atom is preferred. Examples of the alkali metal atom include sodium, lithium, potassium, rubidium, cesium, and the like, and sodium is preferred.

Specific examples of the polymerization inhibitor include a compound represented by general formula (2) below

[Chem. 4]

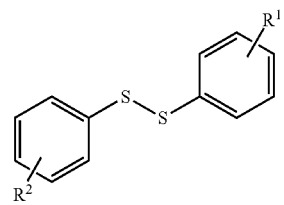
(2)

(in the formula, $R^1$ and $R^2$ may be the same or different and each independently represent a hydrogen atom, a monovalent group represented by general formula (a) below

[Chem. 5]

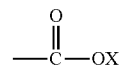
(a)

(in the formula, X represents a hydrogen atom or an alkali metal atom), a monovalent group represented by general formula (b) below

[Chem. 6]

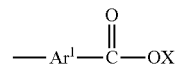
(b)

(in the formula, $Ar^1$ represents an alkylene group having 1 to 6 carbon atoms), or a monovalent group represented by general formula (c) below

[Chem. 7]

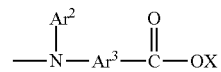
(c)

(in the formula, $Ar^2$ represents a hydrogen atom or an alkyl group having 1 to 3 carbon atoms, and $Ar^3$ represents an alkylene group having 1 to 5 carbon atoms), and at least one of $R^1$ and $R^2$ is any one of the monovalent groups represented by the general formulae (a) to (c)), a compound represented by general formula (3) below

[Chem. 8]

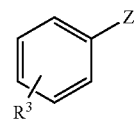
(3)

(in the formula, Z represents an iodine atom or a mercapto group, and $R^3$ represents any one of the monovalent groups represented by the general formulae (a) to (c)), and a compound represented by general formula (4) below

[Chem. 9]

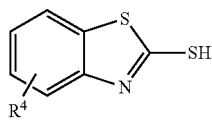

(4)

(in the formula, $R^4$ represents any one of the monovalent groups represented by the general formulae (a) to (c)). Among these, the compound represented by the general formula (2) or (3) is preferred in view of reactivity, and in the general formula (2) or (3), X is particularly preferably a hydrogen atom.

The polyarylene sulfide resin of the present invention can be produced by melt polymerization by heating the diiodo aromatic compound, the elemental sulfur, and the polymerization inhibitor as raw materials and, if required, a catalyst in the presence of a non-oxidizing gas. In this case, the mixing ratio of the diiodo aromatic compound is within a range of 0.5 to 2 moles and preferably within a range of 0.8 to 1.2 moles per mole of the elemental sulfur. The mixing ratio of the polymerization inhibitor is within a range of 0.0001 to 0.1 moles and preferably within a range of 0.0005 to 0.05 moles per mole of the solid sulfur.

Conditions for melt polymerization are not particularly limited, but the melt polymerization is performed at a temperature within a range of 175° C. to the melting point of PAS resin plus 100° C., preferably within a range of 180° C. to 350° C., and an absolute pressure within a range of 1 [cPa] to 100 [kPa], preferably within a range of 13 [cPa] to 60 [kPa]. The melt polymerization conditions need not be constant and, for example, reaction is performed under initial conditions including a temperature within a range of 175° C. to 270° C., preferably within a range of 180° C. to 250° C. and an absolute pressure within a range of 6.7 to 100 [kPa] and then reaction is preferably performed under continuous or stepwise temperature rising and pressure reduction so that the final conditions include a temperature within a range of 270° C. to the PAS resin melting point plus 100° C. or less, preferably within a range of 300° C. to 350° C. and an absolute pressure within a range of 1 [cPa] to 6 [kPa]. In the present invention, the melting point represents a temperature measured by using a differential scanning calorimeter (Perkin Elmer DSC apparatus, Pyris Diamond) according to JIS K 7121.

The melt polymerization reaction is performed by heating the diiodo aromatic compound, the elemental sulfur, the polymerization inhibitor, and, if required, the catalyst in the presence of non-oxidizing gas. The timing for adding the polymerization inhibitor may be basically any timing but the polymerization inhibitor is preferably added at the time when the internal temperature becomes 200° C. to 320° C. and more preferably 250° C. to 320° C. by heating the diiodo aromatic compound, the elemental sulfur, and, if required, the catalyst in the presence of non-oxidizing gas.

A condition of the non-oxidizing gas represents an atmosphere having a gas-phase oxygen concentration of 5% by volume or less, preferably 2% by volume or less, and more preferably an atmosphere substantially not containing oxygen, that is, an inert gas atmosphere such as nitrogen, helium, argon, or the like.

Also, the melt polymerization can be performed by using a known resin melt-kneading machine as long as it is provided with a heating device, a pressure reducing device, and a stirring device. For example, a Banbury mixer, a kneader, a continuous kneading machine, a single screw extruder, a twin screw extruder, or the like can be used.

In the present invention, the melt polymerization is performed in a non-oxidizing atmosphere from the viewpoint that it is possible to produce a polymer with a high degree of polymerization while preventing oxidative cross-linking reaction. In the present invention, the non-oxidizing atmosphere represents an atmosphere having a gas-phase oxygen concentration of 5% by volume or less, preferably 2% by volume or less, and more preferably an atmosphere substantially not containing oxygen, that is, an inert gas atmosphere such as nitrogen, helium, argon, or the like.

Also, in the present invention, the melt polymerization is preferably performed under a condition substantially not containing a solvent. The condition substantially not containing a solvent represents a solvent content within a range of 10 parts by mass or less, preferably 5 parts by mass or less, and more preferably 1 part by mass or less and 0 part by mass or more, preferably 0.01 parts by mass or more, and more preferably 0.1 parts by mass or more.

The polymerization rate of the melt polymerization can be adjusted by adding a nitro compound as the catalyst. Various nitrobenzene derivatives can be generally used as the nitro compound, and examples thereof include 1,3-diiodo-4-nitrobenzene, 1-iodo-4-nitrobenzene, 2,6-diiodo-4-nitrophenol, 2,6-diiodo-4-nitroamine, and the like. The catalyst may be added in an amount in which a catalyst is generally added, and for example, the amount is 0.01 to 20 parts by mass relative to 100 parts by mass of the elemental sulfur.

In the production method of the present invention, the polyarylene sulfide resin having a terminal group represented by the general formula (1) is produced by reaction below.

[Chem. 10]

Reaction formula (1)

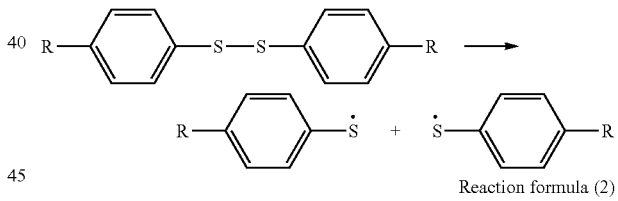

Reaction formula (2)

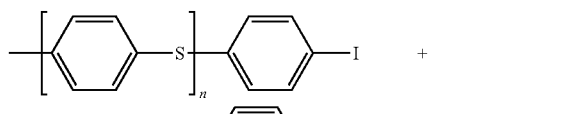

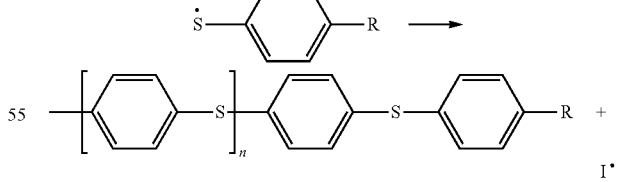

Reaction formula (3)

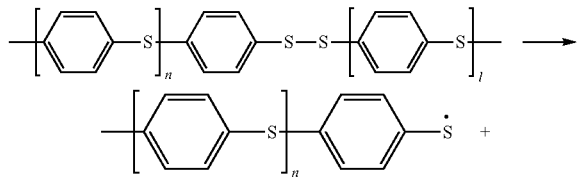

-continued

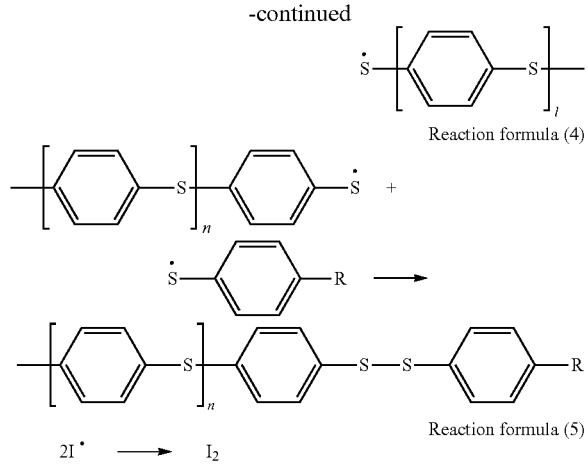

Reaction formula (4)

$2I^\cdot \longrightarrow I_2$

Reaction formula (5)

For example, diphenyl disulfide having a group represented by the general formula (1) is used, a —S—S— bond in the polymerization inhibitor is radically cleaved at a melting temperature (reaction formula (1)), and the produced sulfur radical attacks a carbon atom adjacent to the terminal iodine atom under polymerization to eliminate iodine atoms, thereby producing the polyarylene sulfide resin having a terminal group represented by the general formula (1) (in the formulae, reaction formula (2)). Also, a disulfide bond present due to a raw material (elemental sulfur) in the main chain of the polyarylene sulfide resin is radically cleaved at a melting temperature (reaction formula (3)), and the produced sulfur radicals recombine with sulfur radicals due to a —S—S— bond in the polymerization inhibitor, thereby producing the polyarylene sulfide resin having a terminal group represented by the general formula (1) (in the formulae, reaction formula (4)). The eliminated iodine atoms are in a free state (iodine radical) or iodine molecules are produced by recombination of iodine radicals (reaction formula (5)).

In the present invention, the reaction product obtained by the melt polymerization described above can be once cooled to a solid state and then subjected to further polymerization reaction by heating under reduced pressure or in a non-oxidizing atmosphere under atmospheric pressure. This can not only increase the molecular weight but also suppress the iodine atom concentration in the polyarylene sulfide resin because the produced iodine molecules are removed by sublimation. Cooling to a solid state is performed within a range of 100° C. to 260° C., preferably within a range of 130° C. to 250° C., and more preferably within a range of 150° C. to 230° C. Heating after cooling to a solid state may be performed under the same temperature and pressure conditions as in the melt polymerization, The polyarylene sulfide resin having a terminal group represented by the general formula (1) of the present invention is produced as a reaction product including a polyarylene sulfide resin composition which contains the polyarylene sulfide resin having a terminal group represented by the general formula (1) and iodine atoms within a range of 0.01 to 10,000 ppm, preferably within a range of 10 to 5,000 ppm, based on the polyarylene sulfide resin. The polyarylene sulfide resin composition of the present invention contains as halogen atoms iodine atoms, not chlorine atoms, and thus, as described above, the iodine atom concentration can be suppressed by using sublimability of iodine molecules. In this case, the iodine atom concentration can be suppressed to 900 ppm or less, preferably 100 ppm or less, and more preferably 10 ppm or less. Further, iodine atoms can be removed to a level equal to or lower than the detection limit, but this is not practical in view of productivity.

The polyarylene sulfide resin having a terminal group represented by the general formula (1) of the present invention has a resin structure having as a repeating unit a structure in which an aromatic ring and a sulfur atom are bonded to each other, and is characterized by having a group represented by the general formula (1) on a terminal aromatic ring due to the production method thereof.

More specifically, the polyarylene sulfide resin having a terminal group represented by the general formula (1) of the present invention has a structural moiety as a repeating unit represented by general formula (5) below, and at a terminal

[Chem. 11]

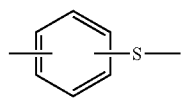

(5)

a structural moiety represented by general formula (6) below

[Chem. 12]

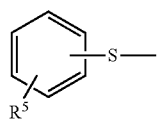

(6)

(in the formula, $R^5$ represents any one of the monovalent groups represented by the general formulae (a) to (c)) or a structural moiety represented by general formula (7) below

[Chem. 13]

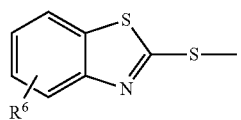

(7)

(in the formula, $R^6$ represents any one of the monovalent groups represented by the general formulae (a) to (c)).

The structural moiety represented by the formula (1) is more preferably a structure bonded at the para-position represented by formula (8) below or

[Chem. 14]

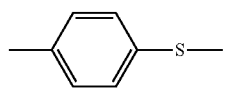

(8)

a structure bonded at the meta-position represented by formula (9) below.

[Chem. 15]

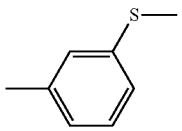
(9)

Among these structures, a structure represented by the structural formula (8) in which a sulfur atom is bonded at the para-position to an aromatic ring in the repeating unit is particularly preferred in view of the heat resistance and crystallinity of the resin.

It is undesirable for the polyarylene sulfide resin of the present invention to have a structure represented by general formula (10) below

[Chem. 16]

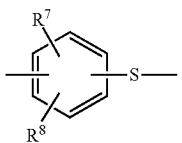
(10)

(in the formula, $R^7$ and $R^8$ each independently represent a hydrogen atom, an alkyl group having 1 to 4 carbon atoms, a nitro group, an amino group, a phenyl group, a methoxy group, or an ethoxy group) which has a repeating unit having a substituent at a side chain, because the structure causes decrease in the degree of crystallinity and heat resistance, and the repeating unit is preferably substantially not contained. The expression "substantially not contained" represents that a ratio is 2 wt % or less and preferably 0.2 wt % or less relative to a total of this repeating unit and the structural moiety represented by the formula (5).

Also, the polyarylene sulfide resin may contain, besides the structural moiety represented by the formula (1), a structural moiety concerning a disulfide bond and represented by structural formula (11) below

[Chem. 17]

(11)

at a ratio of 2.9 wt % or less, and in view of heat resistance and mechanical strength, preferably at a ratio of 1.2 wt % or less of the total of this structural moiety and the structural moiety represented by the formula (5).

The polyarylene sulfide resin having a terminal group represented by the general formula (1) of the present invention has a melting point within a range of 250° C. to 300° C. and preferably within a range of 265° C. to 300° C. Also, the polyarylene sulfide resin of the present invention has melt viscosity (V6) measured at 300° C. within a range of 1 to 2,000 [Pa·s] and more preferably within a range of 5 to 1,700 [Pa·s].

The melt viscosity (V6) measured at 300° C. represents melt viscosity measured after keeping for 6 minutes at a temperature of 300° C. and a load of 1.96 MPa using a flow tester using an orifice having an orifice length/orifice diameter ratio of 10/1.

The polyarylene sulfide resin having a terminal group represented by the general formula (1) of the present invention produced by the production method of the present invention and the resin composition containing the resin can be used singly or in combination with other components and processed into molded products having excellent heat resistance, moldability, dimensional stability, etc. by various melt processing methods such as injection molding, extrusion molding, compression molding, and blow molding.

In particular, the polyarylene sulfide resin of the present invention has a terminal group represented by the general formula (1), and thus a resin composition having excellent adhesion and impact resistance can be produced by using the resin in combination with a silane compound or thermoplastic elastomer having a functional group which shows reactivity to the terminal group. The amount of the silane compound or thermoplastic elastomer mixed varies with the components added and application and cannot be unconditionally determined. The amount is, for example, within a range of 0.01 to 10 parts by mass and preferably within a range of 0.1 to 5 parts by mass relative to 100 parts by mass of the polyarylene sulfide resin.

Examples of the silane compound having a functional group which shows reactivity with the group represented by the general formula (1) include silane coupling agents such as γ-glycidoxypropyl trimethoxysilane, γ-glycidoxypropyl triethoxysilane, β-(3,4-epoxycyclohexyl)ethyl trimethoxysilane, γ-glycidoxypropylmethyl diethoxysilane, γ-glycidoxypropylmethyl dimethoxysilane, and the like. Examples of the thermoplastic elastomer having a functional group which shows reactivity with the group represented by the general formula (1) include thermoplastic elastomers each having an epoxy group, an amino group, a hydroxyl group, a carboxy group, a mercapto group, an isocyanate group, an oxazoline group, or a partial structure represented by the structural formula Ar(CO)O(CO)— or Ar(CO)O— (in the structural formula, Ar represents an alkyl group having 1 to 8 carbon atoms). In particular, the thermoplastic elastomer can be preferably produced by copolymerizing a α-olefin and a vinyl polymerizable compound having the functional group. Examples of the α-olefin include α-olefins having 2 to 8 carbon atoms, such as ethylene, propylene, butane-1, and the like. Examples of the vinyl polymerizable compound having the functional group include α,β-unsaturated carboxylic acids and alkyl esters thereof, such as (meth)acrylic acid, (meth)acrylic acid esters, and the like, α,β-unsaturated dicarboxylic acids and derivatives thereof, such as unsaturated dicarboxylic acids having 4 to 10 carbon atoms such as maleic acid, fumaric acid, itaconic acid, and the like, and mono- and di-esters and anhydrides thereof, glycidyl(meth) acrylate, and the like. Among these, an ethylene-propylene copolymer or ethylene-butene copolymer having in its molecule at least one functional group selected from the group consisting of an epoxy group, a carboxyl group, and a partial structure represented by the structural formula Ar(CO)O (CO)— or Ar(CO)O— (in the structural formula, Ar represents an alkyl group having 1 to 8 carbon atoms) is preferred for improving toughness and impact resistance.

The polyarylene sulfide resin produced by the production method of the present invention can be mixed with an inorganic filler. By mixing the inorganic filler, a composition having high rigidity and high thermal stability can be produced. Examples of the inorganic filler include powdery fillers such as carbon black, calcium carbonate, silica, titanium oxide, and the like, plate-shaped fillers such as talc, mica, and the like, granular fillers such as glass beads, silica beads, glass balloons, and the like, fibrous fillers such as glass fibers, carbon fibers, wollastonite fibers, and the like, glass flakes, and the like. The content of the inorganic filler is within a range of 1 part by mass to 300 parts by mass relative to 100 parts by mass of the polyarylene sulfide resin.

The polyarylene sulfide resin of the present invention can contain as additives a mold release agent, a colorant, a thermal stabilizer, an ultraviolet stabilizer, a foaming agent, anti-rust agent, a flame retardant, and a lubricant within a range of 1 part by mass to 10 parts by mass relative to 100 parts by mass of the polyarylene sulfide resin. Similarly, the polyarylene sulfide resin of the present invention can further contain a synthetic resin and an elastomer described below within a range of 1 part by mass to 300 parts by mass relative to 100 parts by mass of the polyarylene sulfide resin. Examples of the synthetic resin include polyester, polyamide, polyimide, polyetherimide, polycarbonate, polyphenylene ether, polysulfone, polyethersulfone, polyether ether ketone, polyether ketone, polyethylene, polypropylene, polytetrafluoroethylene, polydifluoroethylene, polystyrene, ABS resins, epoxy resins, silicone resins, phenol resins, urethane resins, liquid crystal polymers, and the like. Examples of the thermoplastic elastomer include polyolefin-based elastomers, fluorine-based elastomers, silicone-based elastomers, and the like.

The polyarylene sulfide resin of the present invention or the resin composition containing the resin has performances such as heat resistance, dimensional stability, etc., which are originally possessed by the polyarylene sulfide resin, and are thus widely useful for, for example, electric/electronic components such as a connector, a printed circuit board, an encapsulated product, and the like, automobile components such as a lamp reflector, various electrical components, and the like, various buildings, interior materials of aircrafts and automotive cars, and the like, various molding materials for injection molding or compression molding of precision components such as OA equipment components, camera components, watch components, and the like, extrusion molding or pultrusion molding of a composite, a sheet, a pipe, and the like, or fiber or film materials.

EXAMPLES

The present invention is described in detail below by giving examples. These examples are illustrative and are not limiting.

(Measurement of Melt Viscosity of PPS Resin)

The melt viscosity of PPS resin produced in a reference example was measured after keeping for 6 minutes at 300° C., a load of $1.96 \times 10^6$ Pa, and L/D=10/1 using Shimadzu Corporation flow tester, CFT-500C.

(Method for Evaluating Reactivity)

A PPS resin was ground by a small grinding machine and then sieved by a test sieve having an opening of 0.5 mm according to Japanese Industrial Standards Z8801. Then, 100 parts by mass of the PPS resin passing though the sieve was mixed with 0.5 parts by mass of 3-glycidoxypropyl trimethoxysilane and uniformly mixed, and then melt viscosity V6 was measured. A degree of increase in viscosity was calculated as a magnification from a ratio of melt viscosity V6 after addition/melt viscosity V6 before addition. A higher degree of increase in viscosity indicates higher excellent reactivity.

(Iodine Content in PPS Resin)

The iodine content in the PPS resin was determined by absorbing, in pure water, the gas and residue produced by burning the PPS resin with Diane Instruments combustion gas absorbing device and quantitatively determining iodine ions in the absorption solution by Dionex ion chromatography.

(Ratio of Number of Disulfide Bonds in PPS Resin)

The total amount of sulfur atoms was measured by X-ray fluorescence spectrometer ZSX100e manufactured by Rigaku Denki Co. Ltd. and a ratio of disulfide bonds was determined by a formula below.

$$\text{Ratio of disulfide bond (wt \%)} = \frac{\text{(Total amount of sulfur)} - \text{(Theoretical amount of sulfur in } PAS\text{)}}{\text{(Theoretical amount of sulfur in } PAS\text{)}} \times 2 \times 100 \quad [\text{Math. 1}]$$

(Measurement of Melting Point)

The temperature was increased from 50° C. to 350° C. at 20° C./min by using Perkin Elmer DSC, and an endothermic peak temperature at which a polymer was melted was measured.

Example 1

First, 300.0 g of p-diiodobenzene (Tokyo Chemical Co., Ltd., p-diiodobenzene purity 98.0% or more), 27.00 g of solid sulfur (manufactured by Kanto Chemical Co., Ltd., sulfur (powder)), and 0.60 g of 4,4'-dithiobisbenzoic acid (manufactured by Wako Pure Chemical industries, Ltd., 4,4'-dithiobisbenzoic acid, Technical Grade) were heated to 180° C., melted in nitrogen and mixed. Next, the temperature was increased to 220° C. and the pressure was decreased to an absolute pressure of 26.6 kPa. The resultant melt mixture was subjected to melt polymerization for 8 hours by stepwisely changing the temperature and pressure so that the temperature was 320° C. and the absolute pressure was 133 Pa. The reaction yielded 91 g PPS resin. The measurement results are shown in Table 1.

Example 2

By using the same method as in Example 1 except that "1.0 g of 4,4'-dithiobisbenzoic acid" was used in place of "0.60 g of 4,4'-dithiobisbenzoic acid", 89 g of PPS resin was yielded. The measurement results are shown in Table 1.

Example 3

By using the same method as in Example 1 except that "2.0 g of 4,4'-dithiobisbenzoic acid" was used in place of "0.60 g of 4,4'-dithiobisbenzoic acid", 86 g of PPS resin was yielded. The measurement results are shown in Table 1.

Example 4

By using the same method as in Example 1 except that "0.15 g of 4,4'-dithiobisbenzoic acid" was used in place of "0.60 g of 4,4'-dithiobisbenzoic acid", 93 g of PPS resin was yielded. The measurement results are shown in Table 1.

Example 5

First, 300.0 g of p-diiodobenzene, 27.00 g of solid sulfur, 1.0 g of 4,4'-dithiobisbenzoic acid, and 0.3 g of 1,3-diiodo-4-nitrobenzene were heated to 180° C., melted in nitrogen and mixed. The same subsequent operation as in Example 1 was performed to yield 90 g PPS resin. The measurement results are shown in Table 1.

Example 6

By using the same method as in Example 1 except that p-mercaptobenzoic acid (manufactured by Wako Pure Chemical Industries, Ltd., purity 97%) was used in place of 4,4'-dithiobisbenzoic acid, 93 g of PPS resin was yielded. The measurement results are shown in Table 1.

Example 7

By using the same method as in Example 1 except that p-iodobenzoic acid (manufactured by Wako Pure Chemical Industries, Ltd., purity 98%) was used in place of 4,4'-dithiobisbenzoic acid, 90 g of PPS resin was yielded. The measurement results are shown in Table 1.

First, 280.0 g (0.7 moles of NaOH relative to p-iodobenzoic acid) of a 10% NaOH solution was added to 248.0 g of a solid of p-iodobenzoic acid and stirred for 1 hour. Only a carboxylic acid changed to a Na carboxylate form was dissolved, and an undissolved carboxylic acid form was removed by filtration. A filtrate in which the Na carboxylate form was dissolved was heated to 80° C. under reduced pressure to remove water, thereby producing 120 g of sodium p-iodobenzoate.

By using the same method as in Example 1 except that "sodium p-iodobenzoate" synthesized as described above was used in place of "4,4'-dithiobisbenzoic acid", 90 g of PPS resin was yielded. The measurement results are shown in Table 1.

Example 9

By using the same method as in Example 1 except that p-mercaptophenylacetic acid (manufactured by Wako Pure Chemical Industries, Ltd., purity 97%) was used in place of 4,4'-dithiobisbenzoic acid, 90 g of PPS resin was yielded. The measurement results are shown in Table 1.

Example 10

In a pressure resistant vessel, 83.4 g of a 48% aqueous NaOH solution and 297.4 g of N-methyl-2-pyrrolidone were charged and stirred at 230° C. for 3 hours. Then, the pressure was released at 230° C. to remove water, and then decreased to 0.1 MPa. In a closed state, the temperature was decreased to 200° C. or less. Then, 329.9 g of p-diiodobenzene was melted by heating to 130° C. or more, charged into the reactor, and then heated to 250° C., followed by stirring for 4 hours. After cooling, the contents were taken out, water was added to the contents and stirred, and then unreacted p-diiodobenzene was removed as a residue by filtration. Then, hydrochloric acid was added to an aqueous solution of the filtrate to adjust the aqueous solution to pH 4, and a dark brown oily substance produced in the aqueous solution was extracted by adding chloroform. An aqueous layer contained N-methyl-2-pyrrolidone and 4-methylaminobutyric acid which was a ring-opened product of N-methyl-2-pyrrolidone, and was thus discarded. Further, the chloroform layer was washed with water and separated two times. Then, water and dilute hydrochloric acid were added to the chloroform layer to adjust the pH to 1.0 or less, and consequently the target substance, N-methyl-(p-iodophenyl)-aminobutyric acid was changed to a hydrochloride type and moved to the aqueous layer side. The aqueous layer side contained p-iodophenol as a by-produce and was thus discarded. Then, a 48% aqueous NaOH solution was added to the residual aqueous solution to adjust the pH to 4.0, thereby neutralizing the hydrochloride. As a result, dark brown N-methyl-(p-iodophenyl)-aminobutyric acid was precipitated and thus extracted with chloroform. The solvent was removed under reduced pressure to produce 28.3 g of N-methyl-(p-iodophenyl)-aminobutyric acid, which was then confirmed by a nuclear magnetic resonance apparatus and a mass spectrometer.

By using the same method as in Example 1 except that N-methyl-(p-iodophenyl)-aminobutyric acid synthesized as described above was used in place of "4,4'-dithiobisbenzoic acid", 91 g of PPS resin was yielded. The measurement results are shown in Table 1.

Comparative Example 1

By using the same method as in Example 1 except that "diphenyl disulfide (Sumitomo Seika Chemicals Co., Ltd., DPDS)" was used in place of "4,4'-dithiobisbenzoic acid", 91 g of PPS resin was yielded. The measurement results are shown in Table 1.

Comparative Example 2

By using the same method as in Example 1 except that 340.0 g of 2,5-diiodobenzoic acid (Sigma-Aldrich Corp., 2,5-Diiodobenzoic acid, purity 97%) was used in place of 300.0 g of p-diiodobenzene, and 0.60 g of diphenyl disulfide was used in place of 0.60 g of 4,4'-dithiobisbenzoic acid, 101 g of PPS resin having a carboxyl group in a side chain was yielded. The measurement results are shown in Table 1.

Comparative Example 3

First, 300.0 g of p-diiodobenzene, 170.0 g of 2,5-diiodobenzoic acid, 27.00 g of solid sulfur, and 0.60 g of diphenyl disulfide were heated to 180° C., melted in nitrogen, and then mixed. The same subsequent operation as in Example 1 was performed to yield 95 g of PPS resin having a carboxyl group in a side chain was produced. The measurement results are shown in Table 1.

TABLE 1

| | Melt viscosity (Pa·s) | Melting point (° C.) | Reactivity evaluation (magnification) | Iodine amount (ppm) | Amount of disulfide bond (wt %) |
|---|---|---|---|---|---|
| Example 1 | 520 | 275 | 7 | 600 | 0.4 |
| Example 2 | 170 | 275 | 8 | 250 | 0.3 |
| Example 3 | 80 | 275 | 10 | 200 | 0.2 |
| Example 4 | 800 | 273 | 4 | 1200 | 0.8 |
| Example 5 | 260 | 279 | 7 | 400 | 0.3 |
| Example 6 | 480 | 273 | 7 | 630 | 0.7 |
| Example 7 | 400 | 273 | 6 | 610 | 0.4 |
| Example 8 | 450 | 275 | 3 | 780 | 0.4 |
| Example 9 | 440 | 270 | 5 | 750 | 0.7 |
| Example 10 | 650 | 278 | 8 | 500 | 0.3 |
| Comparative Example 1 | 530 | 274 | 1.1 | 610 | 0.5 |
| Comparative Example 2 | 2 | 240 | NG | 1500 | 0.4 |
| Comparative Example 3 | 10 | 210 | NG | 1300 | 0.4 |

It was found that the PPS resin of Comparative Example 1 shows a low rate of increase in melt viscosity in the reactivity evaluation test and thus has low reactivity to a glycidyl group-containing silane coupling agent. The PPS resins of Comparative Examples 2 and 3 not only could not be made to have a higher molecular weight but also could not be measured in the reactivity test due to gelling.

Example 11

A PPS resin was produced by the same method as in Example 1, molded into pellets having a diameter of 2 mm and a length of 4 mm, and then heat-treated under a nitrogen gas stream at the atmospheric pressure and 150° C. for each of 1 hour, 3 hours, and 20 hours. Then, the iodine amount was measured. The results are shown in Table 2.

TABLE 2

| | Iodine amount (ppm) | | | |
|---|---|---|---|---|
| | 0 hour | 1 hour | 3 hours | 20 hours |
| Example 11 | 600 | 200 | 50 | 5 |

The invention claimed is:

1. A method for producing a polyarylene sulfide resin, the method comprising performing polymerization reaction of a mixture containing a diiodo aromatic compound, elemental sulfur, and a polymerization inhibitor having a group represented by general formula (1) below,

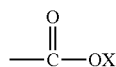
(1)

(in the formula, X represents a hydrogen atom or an alkali metal atom).

2. The method for producing a polyarylene sulfide resin according to claim 1, wherein the polymerization inhibitor is a polymerization inhibitor represented by general formula (2) below

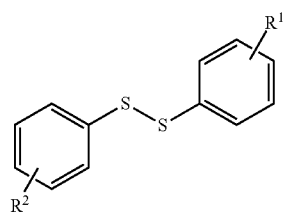
(2)

(in the formula, $R^1$ and $R^2$ may be the same or different and each represent a hydrogen atom, a monovalent group represented by general formula (a) below

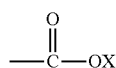
(a)

(in the formula, X represents a hydrogen atom or an alkali metal atom), a monovalent group represented by general formula (b) below

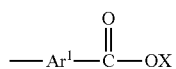
(b)

(in the formula, $Ar^1$ represents an alkylene group having 1 to 6 carbon atoms), or a monovalent group represented by general formula (c) below

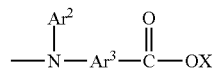
(c)

(in the formula, $Ar^2$ represents a hydrogen atom or an alkyl group having 1 to 3 carbon atoms, and $Ar^3$ represents an alkylene group having 1 to 5 carbon atoms), and at least one of $R^1$ and $R^2$ is any one of the monovalent groups represented by the general formulae (a) to (c)), general formula (3) below

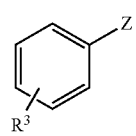
(3)

(in the formula, Z represents an iodine atom or a mercapto group, and $R^3$ represents any one of the monovalent groups represented by the general formulae (a) to (c)), or general formula (4) below

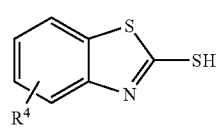
(4)

(in the formula, $R^4$ represents any one of the monovalent groups represented by the general formulae (a) to (c)).

3. The method for producing a polyarylene sulfide resin according to claim 1, wherein the content of the polymerization inhibitor in the mixture is within a range of 0.0001 to 0.1 moles per mole of the elemental sulfur.

4. A polyarylene sulfide resin composition comprising a polyarylene sulfide resin having a terminal group represented by general formula (1) below

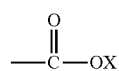
(1)

(in the formula, X represents a hydrogen atom or an alkali metal atom) and iodine atoms at a ratio within a range of 0.01 to 10,000 ppm relative to the polyarylene sulfide resin.

5. The polyarylene sulfide resin composition according to claim 4, wherein the polyarylene sulfide resin is produced by polymerization reaction of a mixture containing a diiodo aromatic compound, elemental sulfur, and a polymerization inhibitor having a group represented by the general formula (1) below,

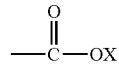
(1)

(in the formula, X represents a hydrogen atom or an alkali metal atom).

6. A polyarylene sulfide resin composition comprising the polyarylene sulfide resin composition according to claim 4 and a compound having a functional group showing reactivity to a glycidyl group, a carboxyl group, a hydroxyl group, or an amino group.

7. A polyarylene sulfide resin molded product produced by molding the polyarylene sulfide resin composition according to claim 4.

\* \* \* \* \*